United States Patent [19]

Jonca

[11] Patent Number: 4,575,931

[45] Date of Patent: Mar. 18, 1986

[54] DEVICE FOR AUTOMATICALLY CONNECTING ELECTRIC CONDUCTORS ON A REGROUPING MEMBER

[75] Inventor: Henri V. J. Jonca, Toulouse, France

[73] Assignee: Societe Nationale Industrielle Aerospatialle, Paris, France

[21] Appl. No.: 589,736

[22] Filed: Mar. 15, 1984

[30] Foreign Application Priority Data

Mar. 16, 1983 [FR] France ................................ 83 04323

[51] Int. Cl.$^4$ .............................................. B23P 19/00

[52] U.S. Cl. .......................................... 29/747; 29/709

[58] Field of Search ................. 29/747, 748, 749, 754, 29/709, 712, 854, 564.1

[56] References Cited

U.S. PATENT DOCUMENTS

| | | | |
|---|---|---|---|
| 3,131,464 | 5/1964 | Wiegel | 29/747 |
| 4,286,379 | 9/1981 | Kawa et al. | 29/741 |
| 4,308,659 | 1/1982 | Brandewie et al. | 29/748 |
| 4,356,626 | 11/1982 | Waghorn | 29/747 |

FOREIGN PATENT DOCUMENTS

| | | | |
|---|---|---|---|
| 2801093 | 7/1979 | Fed. Rep. of Germany | 29/714 |

*Primary Examiner*—Mark Rosenbaum
*Assistant Examiner*—P. W. Echols
*Attorney, Agent, or Firm*—Marshall, O'Toole, Gerstein, Murray & Bicknell

[57] ABSTRACT

The present invention relates to a device for automatically connecting numerous electric conductors on a regrouping member, the device comprising a stationary addressing pattern, comprising a plurality of individually controllable activation members distributed in a disposition similar to that of the connection sites, a controller for the individual activation members, a mobile element bearing, on the one hand, a sensor sensitive to the activation members of the addressing pattern and, on the other hand, the regrouping member, an actuator for moving the mobile element and a controller for the connecting tool actuated directly or indirectly by the sensor.

8 Claims, 5 Drawing Figures

DEVICE FOR AUTOMATICALLY CONNECTING ELECTRIC CONDUCTORS ON A REGROUPING MEMBER

The present invention relates to a device for automatically connecting electric conductors on a regrouping member, for example a connector or a part of connector, and more particularly to a machine for wiring so-called "high-density" electric connectors, i.e. connectors comprising a plurality of male pin contacts or female socket contacts spaced apart from one another by short distances.

The problem raised by the automatic connection of conductors on a regrouping member always comes down to an operation which may be explained simply: any conductor, duly identified, must in fact be brought opposite a connection site, also identified spatially, on the regrouping member, then connected to said site and finally monitored to check that the connection is well made.

Of course, the sequence of connection of the conductors may be included in a more complete cycle comprising more or less automatized prior steps of cable delivery, end stripping, locating and positioning of plug-in pins, as well as subsequent steps for constituting bundles of said conductors.

Numerous automatic positioning devices are known, but, essentially applicable to regrouping members of general type, they are not adapted to sophisticated hardware such as that used in aeronautics, comprising a high density of pins and having to be highly reliable.

It is an object of the invention to provide a machine for automatically connecting conductors, which solves the problems raised very simply and which brings a solution regarding the very high density of pins in the diversity of the hardware encountered.

To this end, according to the invention, the device for automatically connecting numerous electric conductors on a regrouping member comprising a plurality of connection sites for the ends of said conductors, said connection sites being distributed in a regular disposition and each of said conductors being given a code for identification and having to be connected to a specific connection site selected from said plurality, the device comprising a tool for connecting said ends of said conductors to the specific connection sites, one by one, is noteworthy in that it comprises:

a stationary addressing pattern comprising a plurality of individually controllable activation members, distributed in a disposition similar to that of said connection sites of the regrouping member, so that each of said activation members corresponds to one connection site, and only one;

means for controlling the individual activation members of the addressing pattern, receiving the identifying code of the conductor in the course of connection on the regrouping member and activating the corresponding activation member of the addressing pattern;

a mobile element bearing, on the one hand, a sensor sensitive to said activation members of the addressing pattern and, on the other hand, said regrouping member;

displacement means for actuating said mobile element so that said sensor successively scans all the activation members of the addressing pattern and that, simultaneously, the connection sites of the regrouping member come successively in front of the connecting tool, so that, each time, the activation member scanned by the sensor and the connection site opposite the tool are those which correspond; and means for controlling said connecting tool actuated directly or indirectly by said sensor.

In this way, the code of the electric conductor to be connected being transmitted to the means for controlling the individual activation members of the addressing pattern, these means activate that of said activation members whose position, in the addressing pattern, corresponds to the position, in the regrouping member, of the connection site to which said conductor must be addressed. In the course of its successive scanning of the individual activation members of the addressing pattern, the sensor passes without stopping in front of the non-activated activation members, but stops in front of that of said activation members which is activated.

At that moment, the connecting tool and the end of the electric conductor to be connected are located opposite the connection site suitable for the connections. The means for controlling the connecting tool then receive the orders necessary for connecting the conductor to said site either directly from said sensor, or from a detector stopping the movement of the sensor.

It will be noted that the device according to the invention is particularly well adapted, by its structure, to be controlled by a processor to which are indicated the codes of identification of the conductors, the codes of identification of the connection sites on the regrouping member and the table of correspondence between the codes of the conductors and the codes of the connection sites.

In a particularly simple and advantageous embodiment, the plurality of the connection sites and the plurality of the activation members of the addressing pattern are disposed in lines and columns forming identical rectangular or square arrays, the regrouping member and the addressing pattern are parallel to each other, the mobile element is a carriage adapted to slide parallel to said lines and to said columns of said arrays and the sensor and the regrouping member are opposite each other on said carriage.

For the displacement of said carriage, two sets of slides may be provided at right angles, of which one is mobile with respect to the other under the action of a first motor, whilst said carriage is mounted to slide on the set of mobile slides under the action of a second motor.

Each activation member of the addressing pattern may be a light spot, for example the end of a bundle of optical fibers, an electroluminescent diode, a magnetic trace, an electric contact stud, a projecting boss, etc. and as a function of the nature of said activation members, said sensor may be a photoelectric sensor, a magnetic reading head, a wiper, a feeler, etc.

The connecting tool, which is stationary, is preferably mounted to move between a first position, corresponding to its starting and return position for the operation of connection which it is to effect, and a second position, corresponding to the taking over of a conductor to be connected. Said first position is advantageously defined by a fixed support against which said connecting tool abuts.

The invention will be more readily understood on reading the following description with reference to the accompanying drawings, in which.

Figure 4:
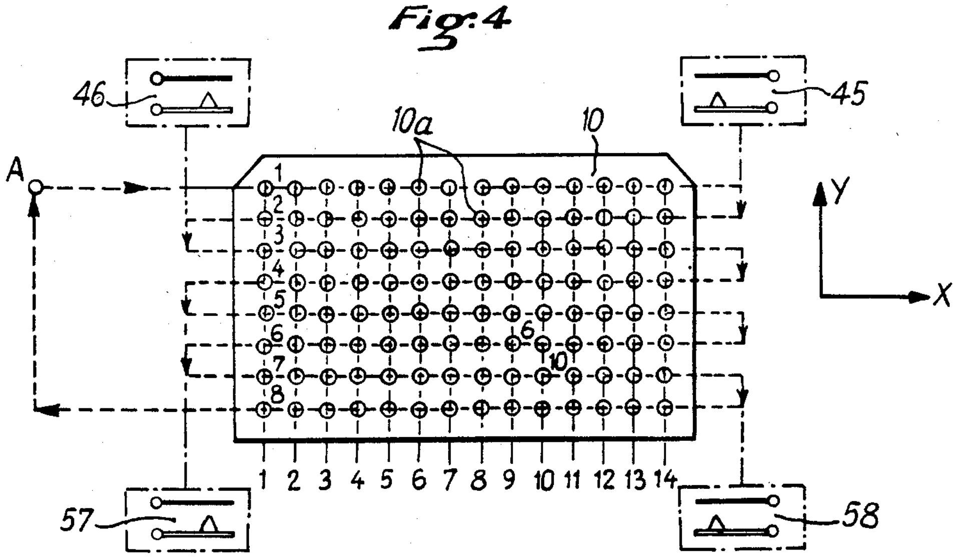

FIG. 4 schematically illustrates the front face of the addressing pattern and its mode of scanning.

Figure 5:
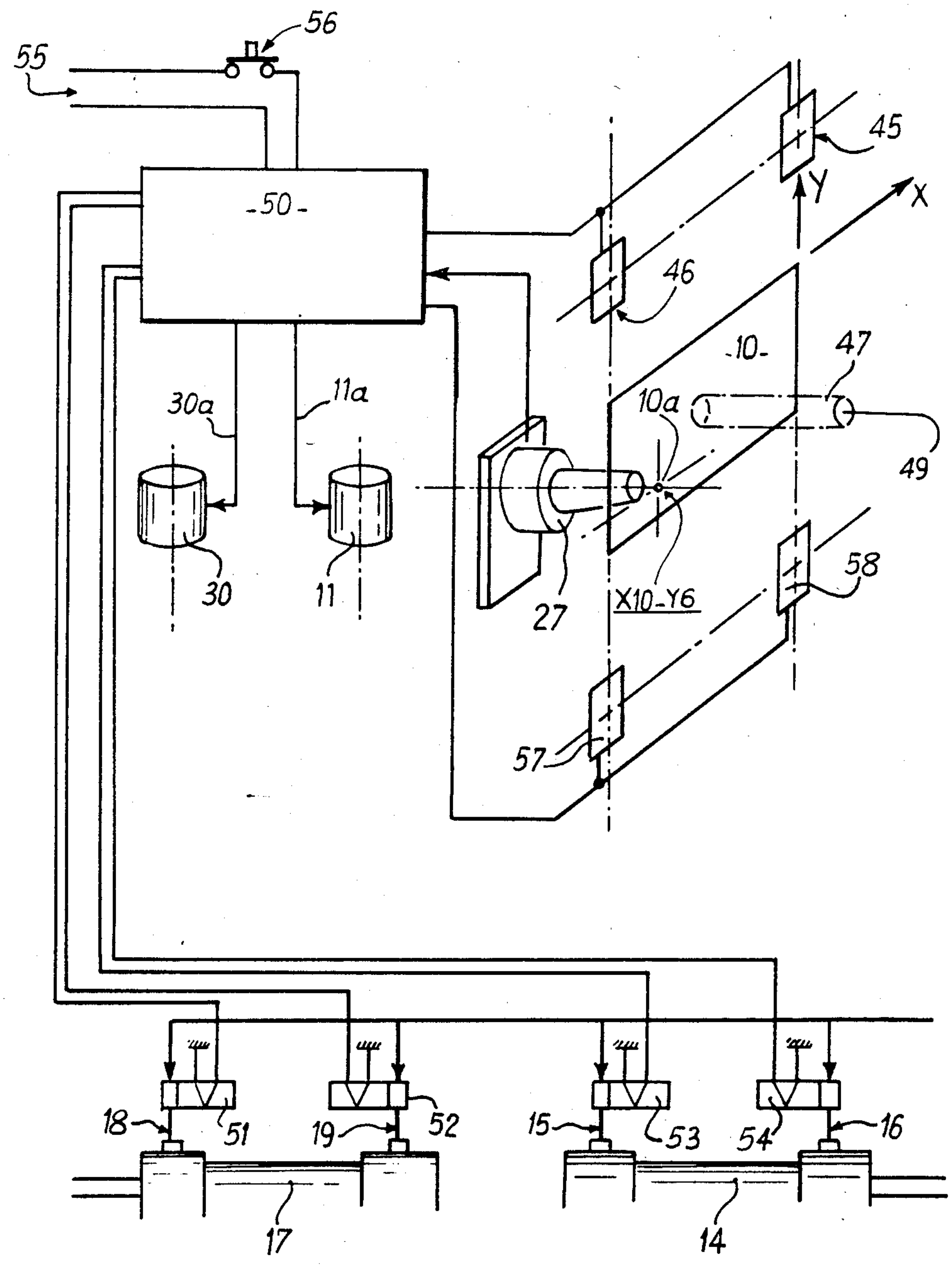

FIG. 5 is a schematic view showing all the control circuits employed in the machine according to the invention.

Figure 1:
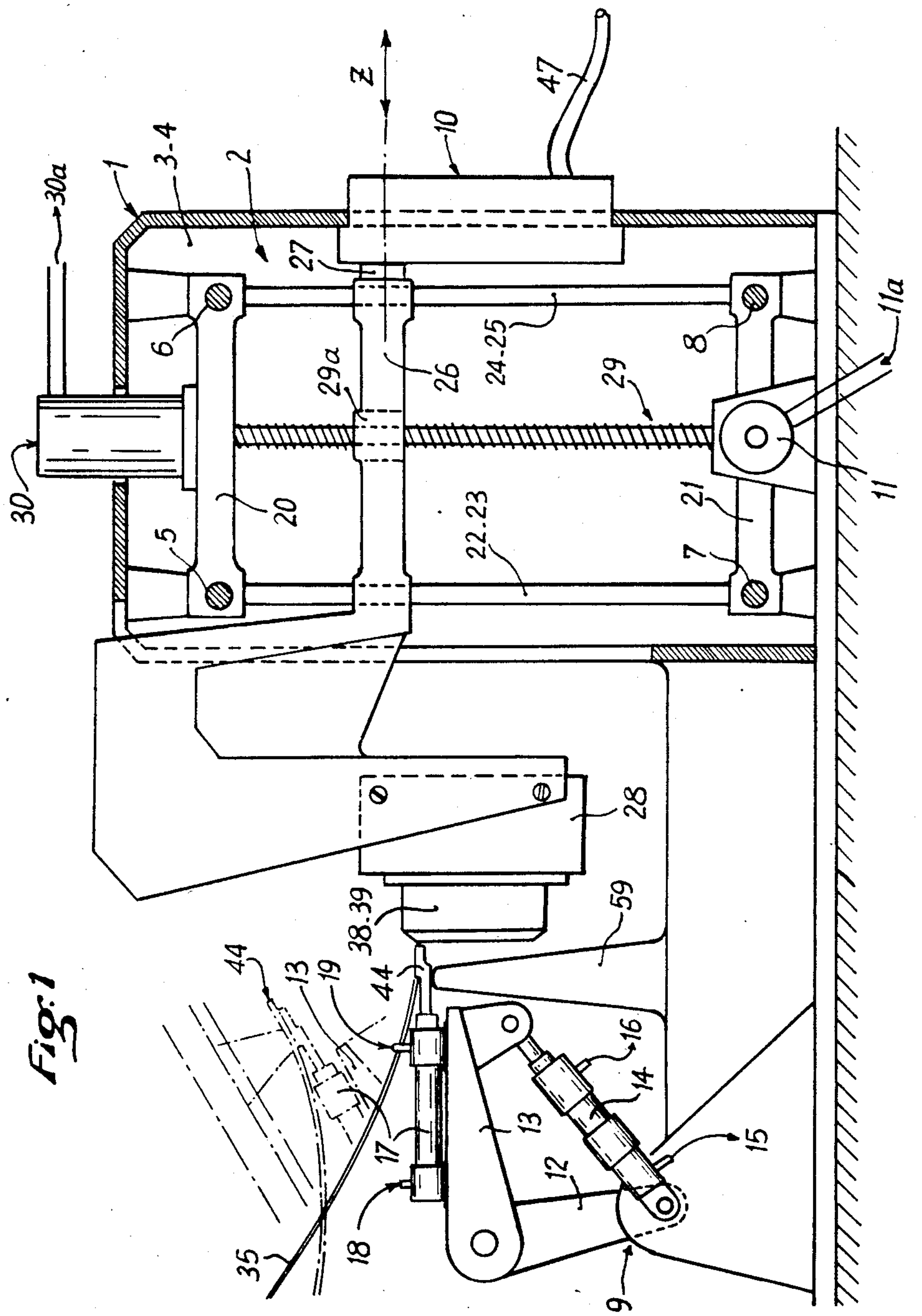
FIG. 1 is a side view, partially in section, of the machine for automatically connecting conductors according to the invention.

Referring now to the drawings, the machine according to the invention, schematically shown in FIG. 1, comprises a fixed frame 1 and a mobile part 2 adapted to move with respect to said fixed frame.

In the embodiment shown, the fixed frame 1 comprises two end plates 3 and 4 opposite each other, bearing slides 5, 6, 7 and 8 and a pivoting part 9, described in greater detail hereinafter.

Moreover, an addressing pattern 10 and a motor 11 adapted to ensure displacement of the mobile part along the X-axis are fixed on the fixed frame 1.

The pivoting part 9 comprises a first pivoting part 12 on which is articulated a second mobile part 13. The mobile part 13 is subjected to an angular displacement whose role will be set forth hereinafter, under the action of a double-acting jack 14 provided with two intakes 15 (for pushing) and 16 (for drawing) for fluid under pressure.

Part 13 supports a second, likewise double-acting jack 17 and provided with intakes 18 (for pushing) and 19 (for drawing) of fluid under pressure: jack 17 is intended for plugging in pins connected to the ends of conductors and its rod bears a tool 44 adapted for this purpose. Jacks 14 and 17 may be of the pneumatic type.

The mobile part 2 comprises two guides 20, 21 sliding on the slides 5, 6, 7 and 8, parallel to the X-axis and joined together by a series of other guides 22–23 and 24–25, parallel to the Y-axis and on which a plate 26 bearing, on one side, a sensor 27 and, on the other side, a support 28, may slide.

The plate 26 is moved along the slides 22 to 25 by a motor 30 actuating a screw 29 screwing in a nut 29*a* fast with the plate 26.

Consequently, it is seen that the movements of the plate 26 along the X- and Y-axes are ensured by the sets of slides 5 to 8 and 22 to 25 and by the motors 11 and 30 supplied by connections 11*a* and 30*a*, respectively.

Figure 2:
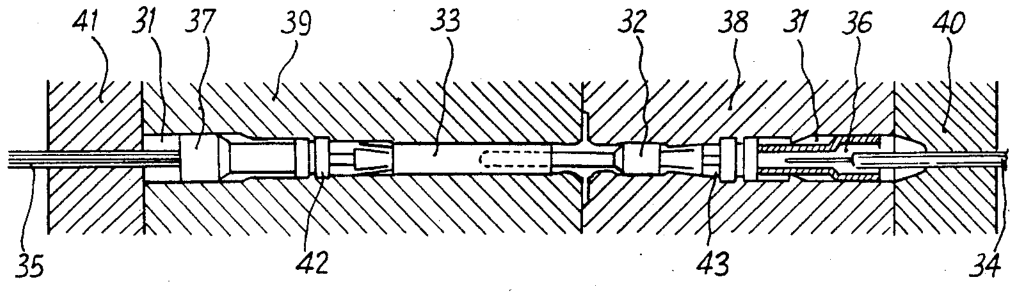
FIG. 2 is a view in partial section of a known connector, which may be wired by the machine according to the invention.

FIG. 2 schematically shows in section a connector of known type provided with male pin contacts and female socket contacts which may be wired by a machine according to the invention.

Each pin contact 32 or socket contact 33 of the connector is crimped on the end of a stripped cable 34 or 35 via a notched type sleeve 36 or 37 and these contacts are clipped in housings 31 provided in the bodies of the male part 38 and of the female part 39 of the complete connector.

Sealing zones 40 or 41 complete the connector, and a contact locking system 42 or 43 is provided, which ensures fixation of each contact, avoiding any accidental extraction thereof.

Figure 3:
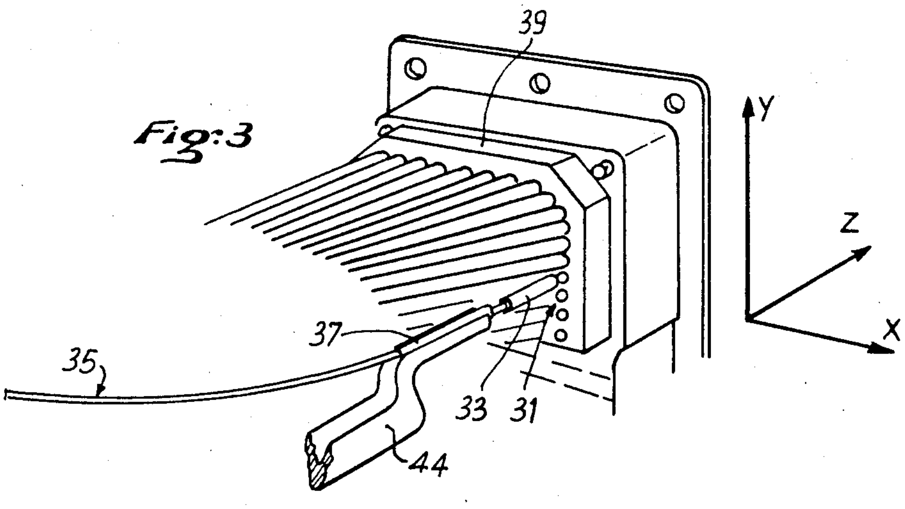
FIG. 3 shows, in partial perspective, the plug-in phase of the conductor in detail.

FIG. 3 illustrates the operation of the machine according to the invention for wiring the female part 39 fo the connector maintained fast with the plate 26 by the support 28 in any known manner.

Each conductor 35, provided with its contact 33 and its locking system 42, is plugged in the corresponding housing 31 with the aid of the plug-in tool 44 disposed on the mobile part of jack 17.

As follows from the arrangement of the elements shown in FIG. 1, for each positioning of each of the contacts 33, the plug-in tool 44 will be located opposite a housing 31 duly marked on the addressing pattern 10.

The latter is constituted, in the example shown, by a pluarlity of light spots 10*a* distributed in an array of X- and Y-axes, identical to that of the housings 31 in the connector part 39 and selectively lit up by an addressing selector 49 (not shown) via bundles of optical fibers 47.

The whole zone of said addressing pattern 10 is scanned by successively scanning the lines of light spots 10*a*, with a view to encountering every activated point of intersection of the array capable of triggering off the movement of positioning of the corresponding contact.

According to FIGS. 1 and 4, the sensor 27 (photoelectric in the example) thus successively scans each line of light spots 10*a* by a reciprocating movement of the plate 26 between two end-of-stroke switches 45 and 46 producing, in known manner, the shift by one line in order to scan the following line in the opposite direction.

The diagram of FIG. 5 makes it possible to understand the complete cycle of the operation.

To each light spot 10*a* encountered by the sensor 27 in its scanning, there corresponds a possible position of immobilization of the tool 44 opposite a housing 31 for a contact 33.

When a sensor 27 passes in front of a spot 10*a* which is not lit up, the plate 26 continues its scanning without stopping. On the other hand, when the sensor 27 reaches a lit up spot 10*a*, the plate 26 stops.

The corresponding contact 33 fixed to its conductor 35 and disposed on said tool 44 will then engage correctly in its corresponding housing 31 in the socket 39, in a movement of Z-axis produced by the jack 17.

This is obtained by a sequential control unit 50 furnishing orders to motors 11 and 30 by the conductors 11*a* and 30*a*, as well as to jacks 14 and 17 by the electrovalves 51, 52 and 53, 54 supplying the compressed air intakes 15, 16 and 18,19. This unit 50 also receives the end-of-stroke orders for scanning from the line end-of-stroke switches 45, 46 and from column end-of-stroke switches 57 and 58. Power controlled by switch 56 is supplied from a source 55, not shown.

In the example shown in FIGS. 4 and 5, only spot 10*a* of coordinates X10, Y6 is lit up. The reading head 27 (of which the point of rest lies at A) successively scans the lines until it encounters lit up spot 10*a* of coordinates X10, Y6, this provoking immobilization of the plug-in tool 44 opposite the housing 31 having the corresponding position on the socket contact 39 and triggering off the actual plug-in sequence by the sequential control unit 50.

It must be noted, with reference to FIG. 1, that advantage is taken of the raised position (shown in broken lines) of the jack 17 to automatically position the contact 33 provided with its conductor 35 on the plug-in tool 44; (however, such a device will not be described in greater detail in the present case).

This raised position is obtained by the action of jack 14. A positive abutment by cooperation of the tool 44 with a support 59 is ensured before the plug-in phase.

All these sequences are, moreover, ensured by the sequential control unit which is programmed to this end.

The invention thus makes it possible to produce a machine for automatically connecting conductors which solves, simply, all the problems previously encountered in this type of activity.

This machine for automatically connecting conductors therefore comprises:

a fixed frame 1 bearing the addressing pattern 10, the motor 11 and the pivoting part 9;

a mobile part 2 ensuring the orthogonal displacements of the plate 26 along X- and Y-axes bearing, on the one hand, the sensor 27 opposite the addressing pattern 10 and, on the other hand, a support 28 connected to said plate 26 and adapted to fix the contact 38 (or 39) to said plate 26;

a means 17 for reciprocating linear displacement connected to an element 13 of the pivoting part 9 and bearing the plug-in tool 44 receiving a male pin contact 32 (or female socket contact 33) crimped by a sleeve 36–37 on the end of the conductor 35 to be connected;

a means 14 for pivoting the pivoting element 13;

means 5, 6, 7, 8, 11 for ensuring the displacements of the mobile part 2;

a sequential control unit 50 for furnishing orders to the displacement means as well as detection means for the spatial immobilization of the mobile part 2;

end-of-stroke interruption and line shift means 45, 46, 57, 58 allowing sequential scanning of the addressing pattern 10 by the detector 27;

these frames, mobile parts, means and sequential control unit being arranged so that the complete sequence of connection is ensured, namely: displacement along the X- and Y-axes of each contact 38–39 opposite the addressing pattern 10, then immobilization of said contact in register with the illuminated characteristic spot 10*a*, pivoting of the plug-in tool 44 in plug-in position of the contact 32–33 fixed on the conductor 35 to be connected, along the Z-axis orthogonal to the X- and Y-axes and possibly safety check of plugging in position for reception of a new cable to be plugged in jointly with the search by sequential scanning of the characteristic spots.

The machine according to the invention is simple to use; adaptation of an addressing pattern 10 as a function of the card for connection of a determined contact 38 or 39 is immediate and may also be programmed (unwinding film for example where only the characteristic spots appear luminous); monitoring of the accidental non-extraction of the contacts may be easily solved through the likewise programmed sequential control unit; controls are simple, either of electromechanical or pneumatic type; and finally, the complete sequence may be rendered entirely automatic by automatically supplying the contacts and the cables on the plug-in tool.

What is claimed is:

1. A device for automatically inserting electric conductors into a regrouping member having a plurality of connection sites disposed in a prearranged pattern, said device comprising:

a frame;

a tool fixed to said frame for connecting an end of one of said conductors to a preselected connection site on a regrouping member;

a carriage mounted in said frame for reciprocating movement and movement perpendicular to said reciprocating movement;

an addressing pattern fixed to said frame comprising a plurality of individually controllable activation members each of which corresponds to a single one of said connection sites, said activation members being arranged in a pattern identical to that of said connection sites;

a sensor sensitive to said activation members, said sensor being mounted in said carriage in proximity to said addressing pattern;

mounting means carried by said carriage and movable therewith for holding a regrouping member in proximity to said tool for connection of a conductor to a selected connection site;

said mounting means and said sensor being so positioned on said carriage that when said sensor is in position to be activated by one of said activation members, said regrouping member is positioned adjacent said tool for insertion of a conductor into the connection site corresponding to said one of said activation members;

displacement means for moving said carriage and said sensor such that said sensor successively scans all of the activation members of the addressing pattern; and means controlled by said sensor for actuating said tool.

2. The device of claim 1, wherein said connection sites and the said activation members of the addressing pattern are disposed in lines and columns forming identical rectangular or square arrays, the regrouping member and the addressing pattern are parallel to each other, said carriage slides in a direction parallel to said lines and to said columns of said arrays, and said sensor and said regrouping member are opposite each other on said carriage.

3. The device of claim 2 wherein said carriage is mounted in said frame by two sets of slides at right angles, of which one is mobile with respect to the other under the action of a first motor, said carriage being mounted to slide on the set of mobile slides under the action of a second motor.

4. The device of claim 1, wherein said activation members of the addressing pattern are selected from the class consisting of luminous, magnetic, electric and mechanical signals.

5. The device of claim 4, wherein said activation members of the addressing pattern are constituted by end sections of bundles of optical fibers and the sensor is of the photoelectric type.

6. The device of claim 1, wherein the connecting tool, which is stationary, is mounted to move between a first position, corresponding to its starting and return position for the operation of connection, and a second position, wherein it picks up a conductor to be connected.

7. The device of claim 6, wherein said first position is defined by a fixed support against which said connecting tool abuts.

8. The device of claim 1, wherein the connecting tool is actuated pneumatically.

* * * * *